US011731518B2

(12) United States Patent
Matsuyama et al.

(10) Patent No.: US 11,731,518 B2
(45) Date of Patent: Aug. 22, 2023

(54) WORKING MACHINE

(71) Applicant: HONDA MOTOR CO., LTD., Tokyo (JP)

(72) Inventors: Wataru Matsuyama, Wako (JP); Takayuki Enomoto, Wako (JP); Makoto Yamanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 264 days.

(21) Appl. No.: 16/424,962

(22) Filed: May 29, 2019

(65) Prior Publication Data
US 2020/0001729 A1 Jan. 2, 2020

(30) Foreign Application Priority Data
Jul. 2, 2018 (JP) .............................. JP2018-126076

(51) Int. Cl.
*B60L 50/60* (2019.01)
*H01M 10/6551* (2014.01)
(Continued)

(52) U.S. Cl.
CPC .............. *B60L 50/66* (2019.02); *E01H 5/061* (2013.01); *H01M 10/613* (2015.04);
(Continued)

(58) Field of Classification Search
CPC . H01M 10/60–615; H01M 10/62–625; H01M 10/656–6566; H01M 50/20;
(Continued)

(56) References Cited

U.S. PATENT DOCUMENTS 6,056,077 A * 5/2000 Kobayashi ............. B62K 5/007
180/216
6,566,005 B1 * 5/2003 Shimma ............ H01M 10/6551
429/71
(Continued)

FOREIGN PATENT DOCUMENTS

CN 107919445 A 4/2018
JP 2011-079510 A 4/2011
(Continued)

OTHER PUBLICATIONS

Machine translation of Kamiya et al. JP 2016/049048. Originally published Apr. 11, 2016 (Year: 2016).*
(Continued)

*Primary Examiner* — Jonathan Crepeau
*Assistant Examiner* — Jacob Buchanan
(74) *Attorney, Agent, or Firm* — Rankin, Hill & Clark LLP

(57) ABSTRACT

A working machine is provided which can suppress the adhesion of rain water, snow, and melting snow to an electrical connecting portion between a battery containing portion side and a battery side. An electrically driven snowplow as a working machine includes a battery pack incorporating a battery, a battery containing portion disposed so as to allow the battery pack to be inserted and removed in a direction inclined from a vertical direction, and an electrode portion configured to be connected with an output terminal of a battery disposed on an upper surface of the battery containing portion.

10 Claims, 9 Drawing Sheets

(51) Int. Cl.
*H01M 10/625* (2014.01)
*H01M 10/613* (2014.01)
*H01M 50/271* (2021.01)
*H01M 50/24* (2021.01)
*H01M 50/202* (2021.01)
*E01H 5/06* (2006.01)

(52) U.S. Cl.
CPC ..... *H01M 10/625* (2015.04); *H01M 10/6551* (2015.04); *H01M 50/202* (2021.01); *H01M 50/24* (2021.01); *H01M 50/271* (2021.01); *B60L 2200/40* (2013.01); *H01M 2220/20* (2013.01)

(58) Field of Classification Search
CPC ........ H01M 50/50–502; H01M 50/543; B60L 50/00; B60L 50/50–66; B60L 50/75; A01D 34/37; A01D 34/58; A01D 34/78; E01H 5/04–068
See application file for complete search history.

(56) References Cited

U.S. PATENT DOCUMENTS

| | | | | |
|---|---|---|---|---|
| 2004/0031632 | A1* | 2/2004 | Kohda | B62K 11/10 180/68.5 |
| 2005/0202310 | A1* | 9/2005 | Yahnker | H01M 10/6235 429/62 |
| 2011/0056177 | A1* | 3/2011 | Goto | B62B 5/0053 56/14.7 |
| 2012/0045671 | A1* | 2/2012 | Miller | H01M 10/6562 429/82 |
| 2012/0316477 | A1* | 12/2012 | Hamaya | H01M 50/256 601/35 |
| 2013/0239533 | A1* | 9/2013 | Juenger | A01D 69/02 56/11.9 |
| 2020/0267903 | A1* | 8/2020 | Gao | A01D 34/78 |

FOREIGN PATENT DOCUMENTS

| | | | | |
|---|---|---|---|---|
| JP | 2012-099383 A | | 5/2012 | |
| JP | 2013-016449 A | | 1/2013 | |
| JP | 2013-021952 | | 2/2013 | |
| JP | 2014-141853 | | 8/2014 | |
| JP | 2016049048 A | * | 4/2016 | ............. A01D 34/68 |
| WO | WO-2019062795 A1 | * | 4/2019 | ........... A01D 75/187 |

OTHER PUBLICATIONS

Japanese Office Action with English translation dated Nov. 9, 2021, 9 pages.

* cited by examiner

WORKING MACHINE

INCORPORATION BY REFERENCE

The present application claims priority under 35 U.S.C. § 119 to Japanese Patent Application No. 2018-126076 filed on Jul. 2, 2018. The content of the application is incorporated herein by reference in its entirety.

BACKGROUND OF THE INVENTION

Field of the Invention

The present invention relates to a working machine.

Description of the Related Art

In an electric snowplow as a working machine, a motor is driven by obtaining electric power from a battery.

Conventionally, as a battery installation and removal structure for a working machine that enables a battery to be installed in and removed from the working machine, there are known a structure in which a battery is installed in a working machine from above (for example, refer to Patent Literature 1) and a structure in which a battery is inserted in a recessed portion provided in a working machine obliquely from above (for example, refer to Patent Literature 2).

CITATION LIST

Patent Literature

Patent Literature 1
  Japanese Patent Laid-Open No. 2014-141853
Patent Literature 2
  Japanese Patent Laid-Open No. 2013-21952

In Patent Literature 1, a battery case where a battery is installed and a control unit placed adjacent to a rear portion of the battery case are mounted on a main body frame, and a connecting coupler provided at an upper portion of the rear portion of the battery case and a connecting coupler provided at an upper portion of a front portion of the control unit are connected together. In this configuration, there is a possibility that rain water and melting snow enter between the battery case and the control unit and further enter between the pair of connecting couplers that are coupled together to adhere to terminals within the connecting couplers. For example, even with a structure in which a battery containing portion provided in a working machine extends in an up-down direction, the same problem remains.

In addition, in Patent Literature 2, since a connector connecting to a motor is provided at a bottom portion of a battery containing portion, there is a possibility that rain water and melting snow are collected to stay at the bottom portion of the battery containing portion, whereby the collected rain water and melting snow adhere to a connecting portion between a battery containing portion side connector and a battery side connector.

SUMMARY OF THE INVENTION

An object of the invention is to provide a working machine capable of preventing rain water, snow, and melting snow from adhering to an electrical connecting portion between a battery containing portion side and a battery side.

An aspect of the present invention includes a battery, a battery containing portion disposed to allow the battery to be inserted and removed in a direction inclined relative to a vertical direction, and an electrode portion disposed on an internal upper surface of the battery containing portion to be connected with a terminal of the battery.

In the invention, the electrode portion may be disposed more inwards of the battery containing portion than a vertical line passing through an upper edge of an opening of the battery containing portion.

In the invention, a bent back portion may be provided in a position in the battery containing portion, closer to an opening side than the electrode portion.

In the invention, a recessed portion or a projecting portion configured to interrupt a flow of water towards the electrode portion or a terminal of the battery may be provided in a position on the internal upper surface of the battery containing portion, closer to the opening side than the electrode portion, or in a position on an upper surface of the battery, closer to the opening side than the terminal of the battery installed in the battery containing portion.

In the invention, the recessed portion or the projecting portion may be formed into a V-like shape, and a closed portion of the V-like shape may be situated on the opening side of the battery containing portion and the battery installed in the battery containing portion, while an open portion of the V-like shape may be situated on a bottom portion side of the battery containing portion and the battery installed in the battery containing portion.

In the invention, the opening of the battery containing portion may be covered by a lid that can be opened and closed, and a distal end portion of the lid may be situated closer to the opening side than the vertical line passing through the upper edge of the opening of the battery containing portion in a fully openable and closable range of the lid.

In the invention, a guide groove configured to guide a slide of the battery may be provided on an internal lower surface of the battery containing portion.

In the invention, the battery may include a heat dissipating portion on the upper surface of the battery, while the battery containing portion may include a warm air vent portion provided on the internal upper surface of the battery containing portion, with the warm air vent portion opposite to the heat dissipating portion of the battery, whereby warm air generated by heat dissipated from the battery may be expelled to an exterior of the battery containing portion via the warm air vent portion.

Advantageous Effects of Invention

Since the aspect of the present invention includes a battery, a battery containing portion disposed to allow the battery to be inserted and removed in the direction inclined relative to the vertical direction, and an electrode portion disposed on an internal upper surface of the battery containing portion to be connected with a terminal of the battery, rain water, snow and melting snow can be restrained from adhering to the electrode portion.

In the invention, since the electrode portion is disposed more inwards of the battery containing portion than the vertical line passing through an upper edge of an opening of the battery containing portion, rain water, snow and melting snow can further be restrained from adhering to the electrode portion.

In the invention, since a bent back portion is provided in a position in the battery containing portion, closer to an opening side than the electrode portion, rain water, snow and melting snow can be restrained from adhering to the electrode portion by blocking rain water, snow, and melting snow by the bent back portion.

In the invention, since a recessed portion or a projecting portion configured to interrupt a flow of water towards the electrode portion or a terminal of the battery is provided in the position on the internal upper surface of the battery containing portion, closer to the opening side than the electrode portion, or in the position on the upper surface of the battery, closer to the opening side than the terminal of the battery contained in the battery containing portion, rain water and melting snow can be prevented from flowing along the internal upper surface of the battery containing portion and the upper surface of the battery to adhere to the electrode portion and the terminal of the battery.

In the invention, since the recessed portion or the projecting portion is formed into a V-like shape, and a closed portion of the V-like shape is situated on the opening side of the battery containing portion and the battery contained in the battery containing portion, while the open portion of the V-like shape is situated on the bottom portion side of the battery containing portion and the battery contained in the battery containing portion, rain water, snow, and melting snow can be caused to flow down efficiently by the V-like shaped recessed portion or projecting portion.

In the invention, since the opening of the battery containing portion is covered by the lid that can be opened and closed, and the distal end portion of the lid is situated closer to the opening side than the vertical line passing through the upper edge of the opening of the battery containing portion in the fully openable and closable range of the lid, the entrance of rain water, snow, and melting snow from the opening into an interior of the battery containing portion can be suppressed further by the lid, thereby making it possible to prevent rain water, snow, and melting snow from adhering to the terminal of the battery and the electrode portion.

In the invention, since a guide groove configured to guide the slide of the battery is provided on the internal lower surface of the battery containing portion, the guide groove on the internal lower surface of the battery containing portion becomes easily visible, facilitating the containment of the battery into the battery containing portion better than providing the guide groove on the internal upper surface of the battery containing portion.

In the invention, since the battery includes a heat dissipating portion on the upper surface of the battery, while the battery containing portion includes a warm air vent portion provided on the internal upper surface of the battery containing portion, with the warm air vent portion opposite to the heat dissipating portion of the battery, whereby warm air generated by heat dissipated from the battery can be expelled to the exterior of the battery containing portion via the warm air vent portion, the warm air generated by the battery can efficiently be expelled from the battery containing portion to the exterior.

DETAILED DESCRIPTION OF THE PREFERRED EMBODIMENTS

Figure 1:
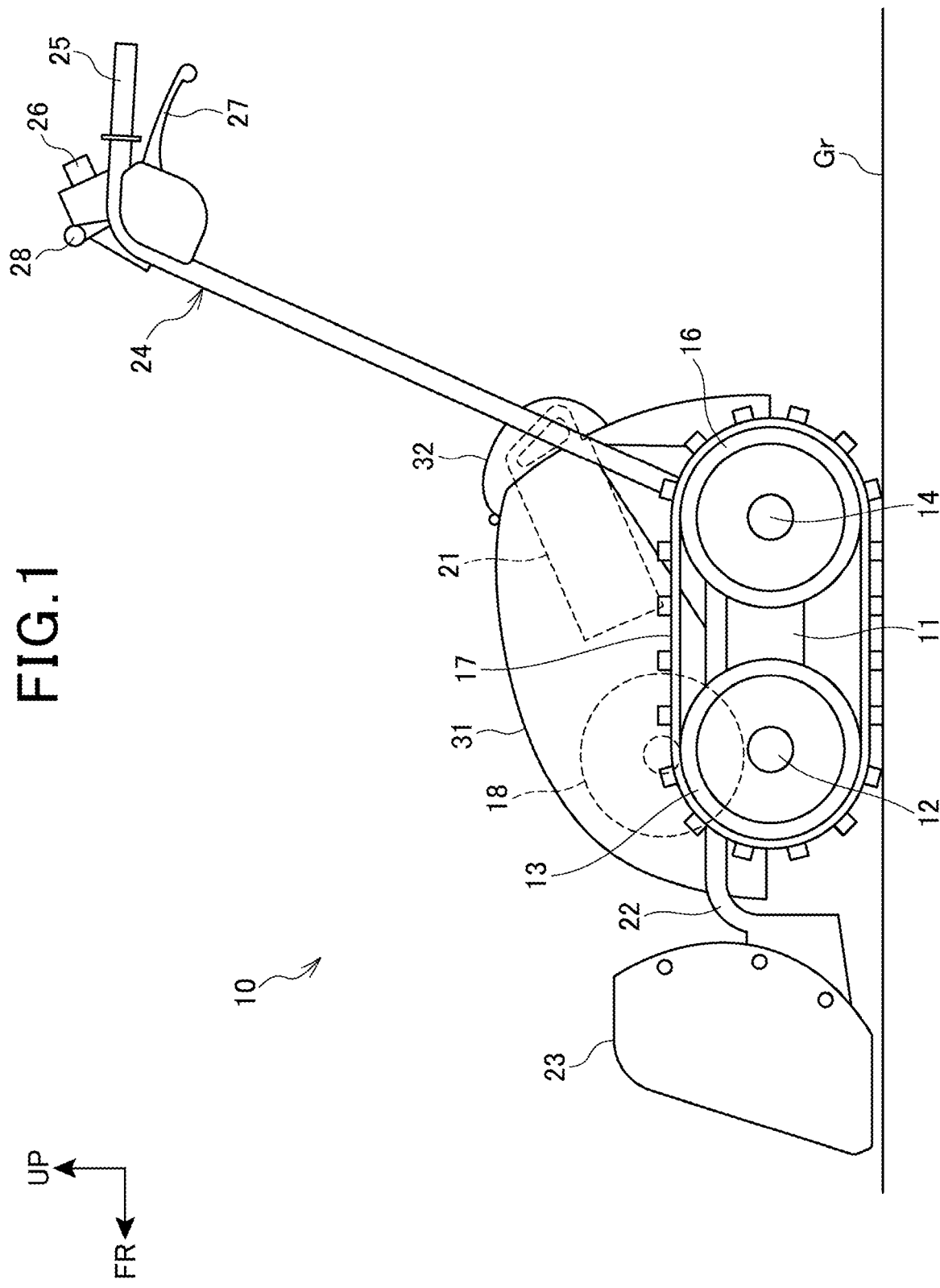
FIG. 1 is a left side view illustrating a snowplow according to a first embodiment of the present invention.

Hereinafter, referring to drawings, embodiments of the present invention will be described. Note that in the following description, when directions denoted by front, rear, right and left, as well as by up and down are referred to, the directions coincide with directions regarding a machine body unless otherwise described. In addition, in the drawings, reference character FR denotes the front of the machine body, reference character UP denotes the top of the machine body, and reference character LH denotes the left of the machine body.

First Embodiment

FIG. 1 is a left side view illustrating a snowplow 10 according to a first embodiment of the present invention.

The snowplow 10 includes a body frame 11, a drive wheel axle 12, a pair of left and right drive wheels 13, a driven wheel axle 14, a pair of left and right driven wheels 16, a pair of left and right crawler belts 17, an electric motor 18, a battery pack 21, a pair of left and right support members 22, a snow displacing plate 23, and a pair of left and right handles 24.

The body frame 11 is a portion constituting a framework of a machine body of the snowplow 10. A power transmission mechanism (not shown) is provided at a front portion of the body frame 11, and the drive wheel axle 12, extending in a left-right direction of the snowplow 10, is provided on the power transmission mechanism. Left and right drive wheels 13 are fixed on the drive wheel axle 12.

The driven wheel axle 14 is attached to a rear portion of the body frame 11 in such a manner as to extend in the left-right direction, and the left and right driven wheels 16 are rotatably attached to the driven wheel axle 14.

The left and right crawler belts 17 are individually extended between the drive wheel 13 and the driven wheel 16 on a left-hand side and between the drive wheel 13 and the driven wheel 16 on a right-hand side.

The electric motor 18 is mounted at the front portion of the body frame 11 and drives the left and right drive wheels 13 via the drive wheel axle 12. This rotates the left and right drive wheels 13 to thereby rotate the left and right crawler belts 17, whereby the snowplow 10 is advanced or reversed to run over a running surface Gr.

The battery pack 21 is detachably contained in an upper portion of a rear portion of the body frame 11, and the battery pack 21 incorporates a battery (not shown) for supplying electric power to the electric motor 18.

The pair of left and right support members 22, extending forwards, are provided at the front portion of the body frame 11, and the snow displacing plate 23, configured to displace snow, is attached to front end portions of the left and right support members 22. The pair of left and right handles 24, extending from the body frame 11 obliquely upwards to the rear, are attached to a rear portion of the body frame 11. Grips 25, configured to be gripped on by an operator, are provided at end portions of the left and right handles 24.

A power supply switch 26 and a running lever 27 are provided on one of the left and right handles 24. The power supply switch 26 is operated to start or stop the operation of the snowplow 10. Switching on the power supply switch 26 actuates the electric motor 18 for operation.

The running lever 27 controls a running speed when the snowplow 10 advances or reverses and stops the snowplow 10. With the running lever 27 left not gripped, the snowplow 10 stops. Gripping the running lever 27 can control the running speed according to a gripping amount.

A shift lever 28 is provided on the other of the left and right handles 24. With the shift lever 28, the snowplow 10 is caused to advance, reverse and stop.

The body frame 11 is covered with a body cover 31 from above. The battery pack 21, which is contained in a containing portion, projects at an upper portion of a rear portion of the body cover 31, and a projecting portion of the battery pack 21 is covered with a lid 32, which is provided to be opened and closed on the body cover 31.

Figure 2:
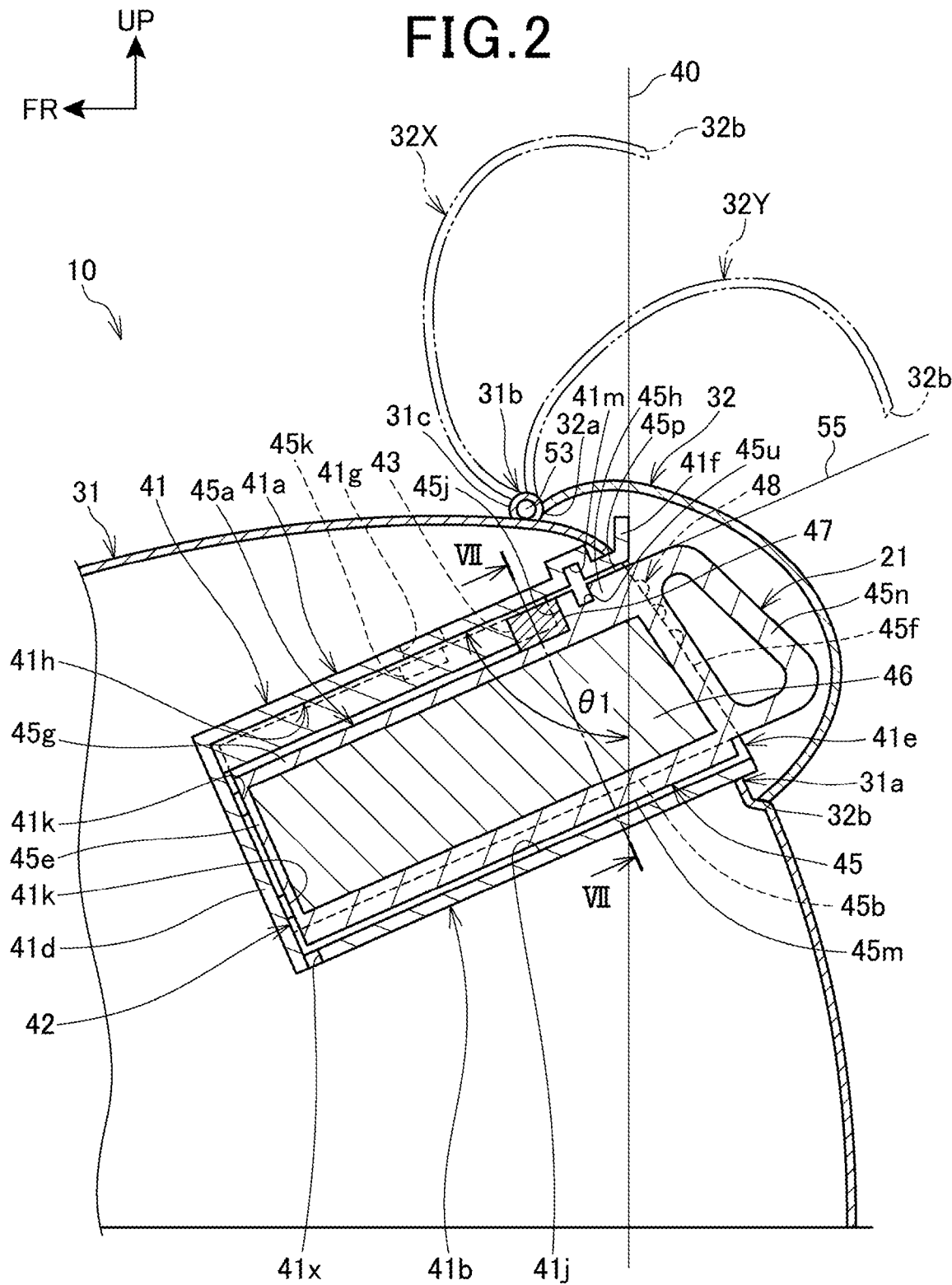
FIG. 2 is a sectional view illustrating a battery pack containing structure of the first embodiment.

FIG. 2 is a cross-sectional view illustrating a battery pack containing structure of the first embodiment and taken in an up-down direction along a center line extending in a front-rear direction while passing through a transverse center of the snowplow 10.

A battery containing portion 41 configured to detachably contain the battery pack 21 is disposed at an upper portion of a rear portion of the body frame 11 (refer to FIG. 1).

The battery containing portion 41 is formed into a box shape having an upper wall 41a, a lower wall 41b, a pair of left and right side walls 41c (refer to FIG. 3) and a bottom wall 41d and includes a containing portion opening 41e through which the battery pack 21 is inserted and removed. The battery containing portion 41 is made from a resin and is supported on the body frame 11. The upper wall 41a and the lower wall 41b of the battery containing portion 41 are inclined by angle θ1 relative to a vertical line 40 that extends vertically so that a containing portion opening 41e is situated above or at the same height as the bottom wall 41d. The angle θ1 is set to be in a range of 0<θ1≤90°.

The upper wall 41a includes a bent back portion 41f that extends integrally upwards from an upper edge of the containing portion opening 41e and a pair of left and right warm air vent portions 41g configured to release therethrough warm air inside the battery containing portion 41 to the exterior of the battery containing portion 41 in cooperation with the containing portion opening 41e.

An electrode portion 43, which is electrically connected with a battery pack 21 side, is provided on an upper surface 41h that constitutes an inner surface of the upper wall 41a.

A plurality of drain holes 41x and a guide groove 41j are formed in and on the lower wall 41b, respectively, the plurality of drain holes 41x formed at a front edge that becomes lowest, the guide groove 41j guiding the battery pack 21 when the battery pack 21 is caused to slide into a predetermined position inside the battery containing portion 41 for containment.

The bottom wall 41d includes a plurality of projecting abutment portions 41k with which the battery pack 21 is brought into abutment, whereby a venting gap 42 is formed between the bottom wall 41d and the battery pack 21 contained by the plurality of abutment portions 41k.

The battery pack 21 includes a battery case 45, a battery 46 incorporated in the battery case 45, and an output terminal 47 attached to an outer surface of the battery case 45 to output electric power of the battery 46.

The battery case 45 is formed into a box shape including an upper wall 45a, a lower wall 45b, a pair of left and right side walls 45c (refer to FIG. 7), a front wall 45e, and a rear wall 45f.

The upper wall 45a includes a lowered wall 45g that is formed on a side facing the front wall 45e, a raised wall 45h surrounding the lowered wall 45g from the left, right and rear and formed higher than the lowered wall 45g, and a step portion 45j formed between the lowered wall 45g and the raised wall 45h.

A pair of left and right heat dissipating portions 45k is provided on the raised wall 45h to promote the dissipation of heat from the battery 46. The output terminal 47 is provided adjacent to the step portion 45j.

The lower wall 45b includes a case projecting portion 45m configured to be inserted slidably in the guide groove 41j of the battery containing portion 41.

The rear wall 45f integrally includes a handle 45n gripped on by the hand, and a residual amount indicator 48 configured to indicate a residual amount of the battery 46 is provided on the rear wall 45f situated to a side of the handle 45n. The residual amount indicator 48 is made up of a plurality of light emitting portions designed so that the number of light emitting portions to be illuminated changes according to a residual amount of the battery 46.

A cover opening 31a is provided at the upper portion of the rear portion of the body cover 31, the battery containing portion 41 is inserted through the cover opening 31a.

A hinge portion 31b is provided at an upper portion of the body cover 31, and the lid 32 is attached to the hinge portion 31b so as to be opened and closed.

The hinge portion 31b is made up of a hinge base portion 31c formed on the body cover 31 and a hinge shaft 53 fixed to the hinge base portion 31c, and one end portion 32a of the lid 32 is supported on the hinge shaft 53 so as to swing.

The lid 32 is a fully or partially transparent member and covers the containing portion opening 41e of the battery containing portion 41 and one end portion of the battery pack 21 contained in the battery containing portion 41. With the lid 32 formed fully or partially transparent, the residual amount indicator 48 of the battery pack 21 can be visible from an exterior of the snowplow 10 when the lid 32 is kept closed. The other end portion 32b of the lid 32 can be brought into engagement with an edge portion of the cover opening 31a of the body cover 31 via an engagement portion, not shown.

Lids 32X, 32Y indicated by chain double-dashed lines in the drawing indicate the lid 32 that is held in an open state by a holding structure, not shown. The lid 32X stays in a fully open state. In the fully opened lid 32X, the other end portion 32b of the lid 32X is situated behind a vertical line 40 passing through an upper edge of the containing portion opening 41e of the battery containing portion 41 (that is, on an upper side of the containing portion opening 41e than the vertical line 40). By setting the fully opened position of the lid 32X in this way, even though the lid 32X is opened fully, rain water and snow can be made to hardly enter an interior of the battery containing portion 41 from the containing portion opening 41e.

The lid 32Y is situated at an intermediate portion between the fully closed lid 32 and the fully opened lid 32X. In the lid 32Y staying in the intermediate position, the other end portion 32b of the lid 32Y is situated above an extension 55 of an upper surface 45p of the upper wall 45a of the battery pack 21. By adopting this configuration, even at the time of raining or snowing, the battery pack 21 can be installed or removed while preventing rain water or snow from entering the interior of the battery containing portion 41 from the containing portion opening 41e.

Figure 3:
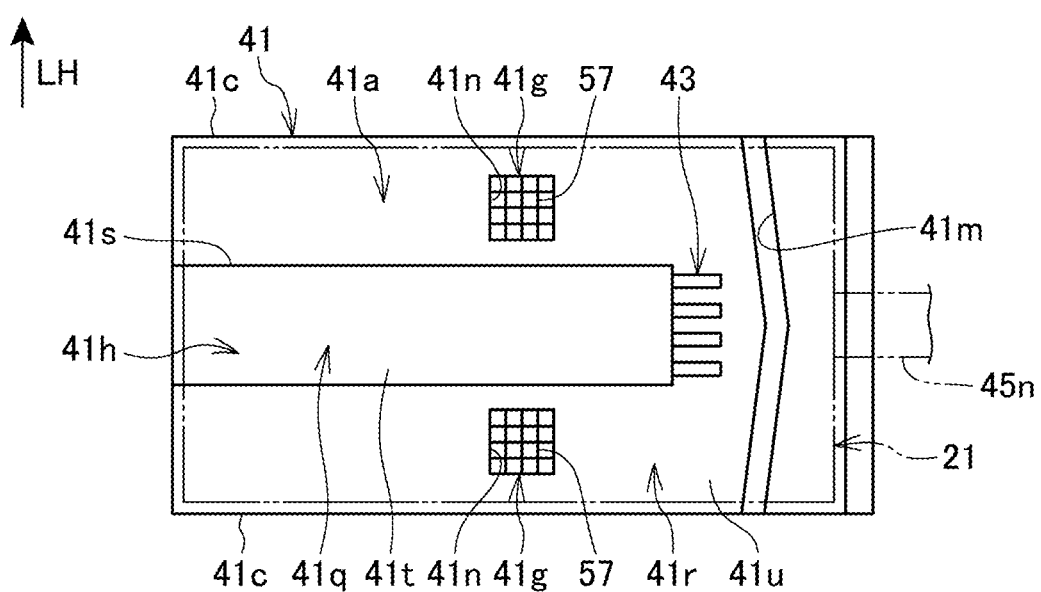
FIG. 3 is a view illustrating an upper surface constituting an inner surface of an upper wall of a battery containing portion (the first embodiment)
Figure 4:
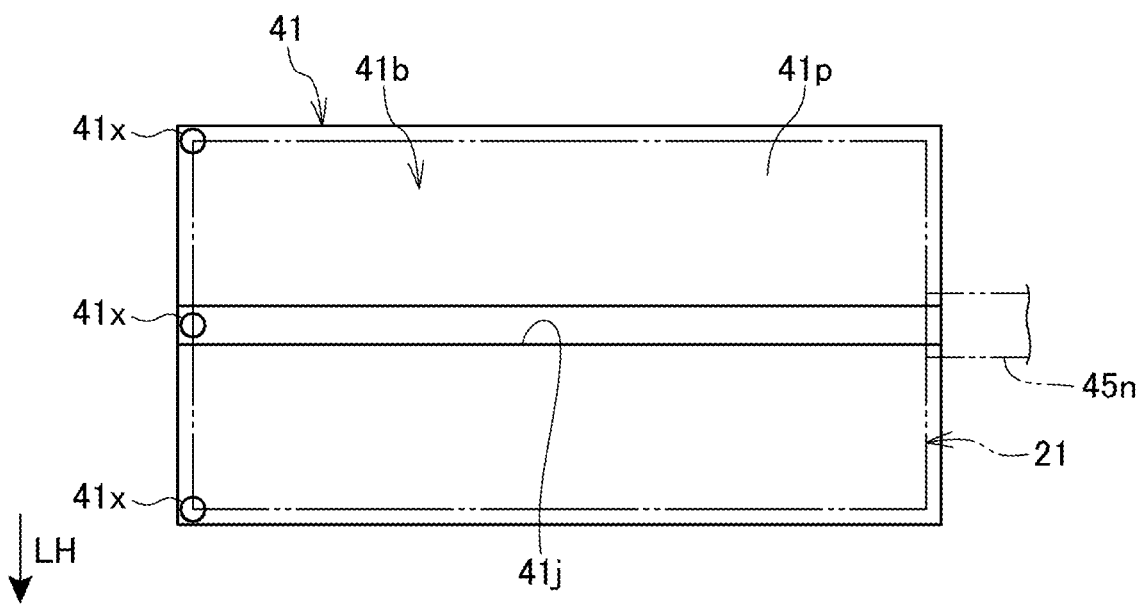
FIG. 4 is a view illustrating a lower surface constituting an inner surface of a lower wall of the battery containing portion (the first embodiment)

FIG. 3 is a view illustrating the upper surface 41h that constitutes the inner surface of the upper wall 41a of the battery containing portion 41 (the first embodiment), FIG. 4 is a view illustrating the lower surface 41p constituting the inner surface of the lower wall 41b of the battery containing portion 41 (the first embodiment).

In the drawings, the battery pack 21 is indicated by chain double-dashed lines.

As illustrated in FIG. 3, the upper wall 41a of the battery containing portion 41 includes a lowered wall 41q, a raised wall 41r, and a step portion 41s.

The lowered wall 41q is formed at a transverse center of the upper wall 41a in such a manner as to extend in a front-rear direction (in a longitudinal direction of the battery pack 21). An upper surface 41t constituting an inner surface of the lowered wall 41q is formed flat.

The raised wall 41r is formed at the left, right and rear of the lowered wall 41q and is formed taller than the lowered wall 41q. The step portion 41s is a portion extending in the up-down direction in such a manner as to connect the lowered wall 41q and the raised wall 41r together.

The electrode portion 43, projecting from an upper surface 41u of the raised wall 41r, is disposed at an end portion of the lowered wall 41q that is situated at a side facing the containing portion opening 41e (refer to FIG. 2). The warm air vent portions 41g are individually provided in the raised wall 41r at the left and right of the lowered wall 41q, specifically speaking, in the upper surface 41u constituting an inner surface of the raised wall 41r. A groove 41m, extending into a V-like shape in the left-right direction, is formed between the containing portion opening 41e and the electrode portion 43 on the upper surface 41u of the raised wall 41r at the rear of the lowered wall 41q. The groove 41m is formed along a full width of the upper surface 41u.

The upper surface 41h of the upper wall 41a is made up of the upper surface 41t and the upper surface 41u, which are described above.

The electrode portion 43 is made up of a plurality of plate-like terminals connected to an electric motor 18 (refer to FIG. 1) side, and the plurality of terminals extend individually in a direction in which the battery pack 21 is installed and removed (in the front-rear direction) and are arranged side by side in the left-right direction at predetermined intervals.

The left and right warm air vent portions 41g are made up, respectively, of a pair of left and right containing portion vent holes 41n formed in the upper wall 41a and mesh members 57 individually covering the corresponding left and right containing portion vent holes 41n.

The left and right containing portion vent holes 41n penetrate the upper wall 41a. Each of the mesh members 57 is made of metal or resin, has a plurality of fine meshes and is attached to an edge of the containing portion vent hole 41n. The plurality of meshes prevents sand or dust from entering the interior of the battery containing portion 41 from the exterior and allows warm air in the interior of the battery containing portion 41 to be released to the exterior.

Warm air discharged from the warm air vent portions 41g to the exterior of the battery containing portion 41 is then discharged to an exterior of the snowplow 10 (refer to FIG. 1) from vent openings (not shown) disposed at other locations than above the battery containing portion 41 of the body cover 31 (refer to FIG. 1). The warm air vent portions 41g are covered thereabove with the body cover 31, whereby rain water, snow, and melting snow are prevented from entering the interior of the battery containing portion 41 from the warm air vent portions 41g. Note that although the containing portion vent holes 41n are formed at the longitudinally central portion of the upper wall 41a, the configuration is not limited thereto, and hence, the containing portion vent holes 41n may be formed closer to a rear portion of the upper wall 41a where warm air is easily discharged.

The groove 41m constitutes a portion configured to prevent rain water and melting snow that flows from the containing portion opening 41e along the upper surface 41h (specifically, the upper surface 41u of the raised wall 41r) of the upper wall 41a from reaching the electrode portion 43. The groove 41m is formed into the V-like shape in which transverse left and right ends (opened portions of the V-like shape) are situated on a lower side (a front) of the upper surface 41h than a transverse center (a closed portion of the V-like shape).

By forming the groove 41m into the V-like shape in the way described above, rain water and melting snow flow to the transverse left and eight ends of the upper surface 41h (specifically, the upper surface 41u) along the groove 41m and then flow to the lower wall 41b (refer to FIG. 4) via the left and right side walls 41c. As a result, rain water and melting snow can be prevented from adhering to the electrode portion 43 by the groove 41m.

As illustrated in FIG. 4, the plurality of drain holes 41x, configured to discharge water entering the interior of the battery containing portion 41 to the exterior, are formed at the front edge of the lower surface 41p of the battery containing portion 41. Additionally, the guide groove 41j is formed on the lower surface 41p of the battery containing portion 41 in such a manner as to extend in the direction in which the battery pack 21 is installed and removed (in the front-rear direction) while passing through the transverse center of the lower surface 41p. The case projecting portion 45m (refer to FIG. 6) of the battery pack 21 is slidably inserted into the guide groove 41j.

Figure 5:
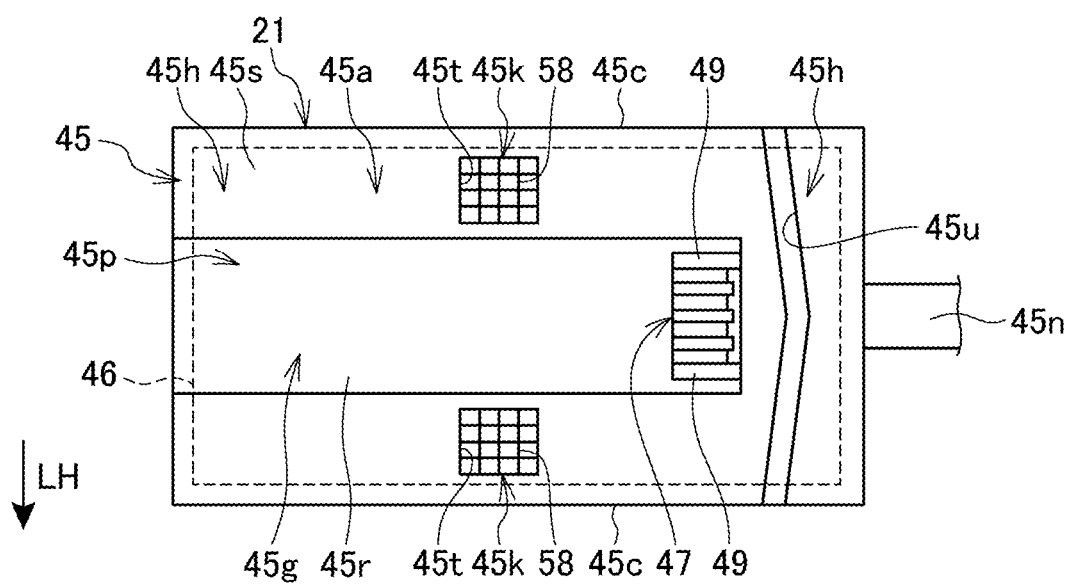
FIG. 5 is a view illustrating an upper surface of an upper wall of a battery pack (the first embodiment)
Figure 6:
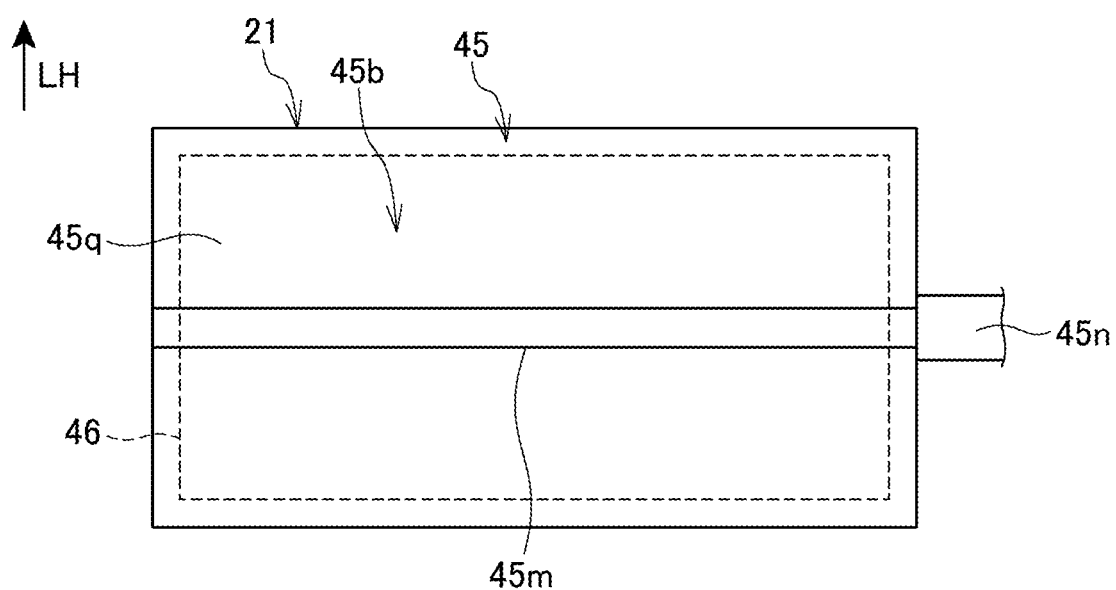
FIG. 6 is a view illustrating a lower surface of a lower wall of the battery pack (the first embodiment)

FIG. 5 is a view illustrating the upper surface 45p of the upper wall 45a of the battery pack 21 (the first embodiment), and FIG. 6 is a view illustrating the lower surface 45q of the lower wall 45b of the battery pack 21 (the first embodiment).

As illustrated in FIG. 5, the upper surface 45p of the upper wall 45a is made up of an upper surface 45r of the lowered wall 45g and an upper surface 45s of the raised wall 45h.

The output terminal 47 is provided at an end portion of the upper surface 45r of the lowered wall 45g, the end portion situated to face the handle 45n.

The output terminal 47 is made up of the plurality of plate-like terminals connected with the battery 46, and the plurality of terminals each extend in the direction in which the battery pack 21 is installed and removed (in the front-rear direction) and are arranged side by side in the left-right direction at the predetermined intervals. The output terminal 47 may be covered from left and right sides thereof by a pair of left and right projecting walls 49 formed on the upper surface 45r. The output terminal 47 can be protected by the left and right projecting walls 49.

A pair of left and right heat dissipating portions 45k and a groove 45u extending in the left-right direction are provided on the upper surface 45s of the raised wall 45h.

The left and right heat dissipating portions 45k are made up, respectively, of a pair of left and right battery pack vent holes 45t formed in the upper wall 45a (specifically, a longitudinally central portion of the upper wall 45a) and mesh members 58 individually covering the corresponding left and right battery pack vent holes 45t.

The left and right battery pack vent holes 45t penetrate the upper wall 45a and communicate with a containing portion of the battery 46 in the battery pack 21. Each of the mesh members 58 is made of metal or resin, has a plurality of fine meshes and is attached to an edge of the corresponding battery pack vent hole 45t. The plurality of meshes prevents sand or dust from entering the interior of the battery case 45 from the exterior and allows warm air generated by heat of the battery 46 in the battery case 45 to be released to the battery containing portion 41.

The groove 45u constitutes a portion configured to prevent rain water and melting snow that flows from the containing portion opening 41e (refer to FIG. 2) along the upper surface 45s of the upper wall 45a from reaching the output terminal 47. The groove 45u is formed into a V-like shape in which transverse left and right ends (opened portions of the V-like shape) are situated on a lower side (a front) of the upper surface 45s than a transverse center (a closed portion of the V-like shape) and is formed along an overall width of the upper surface 45s.

By forming the groove 45u into the V-like shape in the way described above, rain water and melting snow flow to the transverse left and eight ends of the upper surface 45s and then flow to the lower wall 45b (refer to FIG. 6) via the left and right side walls 45c. As a result, rain water and melting snow can be prevented from adhering to the output terminal 47.

As illustrated in FIG. 6, the case projecting portion 45m is formed on the lower surface 45q of the battery pack 21 in such a manner as to extend in the direction in which the battery pack 21 is installed and removed (in the front-rear direction) while passing through a transverse center. The case projecting portion 45m is slidably inserted in the guide groove 41j (refer to FIG. 4).

Thus, as illustrated in FIGS. 2, 3 and 5, the grooves 41m, 45u as the recessed portions or projecting portions configured to block the flow of water to the electrode portion 43 or the output terminal 47 of the battery 46 are provided on the upper surface (the internal upper surface) 41h of the battery containing portion 41 in the position situated closer to the containing portion opening 41e than the electrode portion 43 or on the upper surface 45p of the battery pack 21 in the position situated closer to the containing portion opening 41e than the output terminal 47 as the terminal of the battery 46 of the battery pack 21 contained in the battery containing portion 41.

According to this configuration, rain water and melting snow can be prevented from flowing along the upper surface 41h of the battery containing portion 41 or the upper surface 45p of the battery 46 to adhere to the electrode portion 43 or the output terminal 47 of the battery 46.

The grooves 41m, 45u or the projecting portions are both formed into the V-like shape. The closed portion of the V-like shape is situated at a side of the battery containing portion 41 and the battery pack 21 contained in the battery containing portion 41 with the side situated to face the containing portion opening 41e, while the open portion of the V-like shape is situated at a side of the battery containing portion 41 with the side situated to face the bottom wall 41d as the bottom portion of the battery containing portion 41, and at a side of the battery pack 21 contained in the battery containing portion 41 with the side situated to face the front wall 45e as the bottom portion of the battery pack 21.

According to this configuration, rain water, snow and melting snow can be moved transversely outwards to flow down therefrom efficiently by the V-like shaped grooves 41m, 45u or the projecting portions.

As illustrated in FIGS. 2, 4 and 6, the guide groove 41j configured to guide the slide of the battery pack 21 that incorporates the battery 46 is provided on the lower surface (the internal lower surface) 41p of the battery containing portion 41.

According to this configuration, since the guide groove 41j on the lower surface 41p of the battery containing portion 41 becomes easily visible from above, the insertion of the battery pack 21 into the battery containing portion 41 can be facilitated further than providing the guide groove 41j on the upper surface 41h of the battery containing portion 41.

As illustrated in FIGS. 2, 3 and 5, the battery pack 21 includes the heat dissipating portions 45k on the upper surface 45p. Additionally, the battery containing portion 41 includes the warm air vent portions 41g provided on the upper surface 41h in such a manner as to be opposite to the heat dissipating portions 45k of the battery pack 21. Warm air generated by heat dissipated from the battery 46 is discharged to the exterior of the battery containing portion 41 via the warm air vent portions 41g.

According to this configuration, warm air generated from the battery 46 can efficiently be discharged from the battery containing portion 41 to the exterior.

Figure 7:
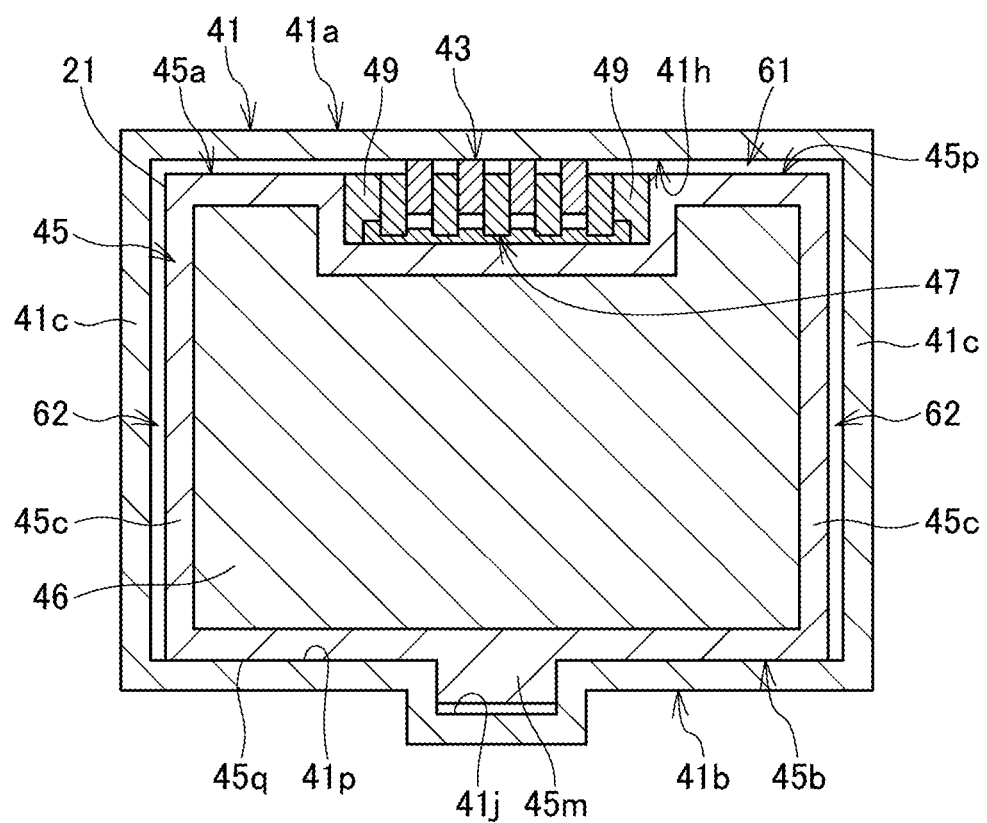
FIG. 7 is a cross-sectional view taken along a line VII-VII in FIG. 2 (the first embodiment)

FIG. 7 is a cross-sectional view taken along a line VII-VII in FIG. 2 (the first embodiment).

A gap 61 is provided between the upper surface 41h of the battery containing portion 41 and the upper surface 45p of the battery pack 21, and gaps 62 are individually provided between the left and right side walls 41c of the battery containing portion 41 and the left and right side walls 45c of the battery pack 21. In addition, as illustrated in FIG. 2, a gap 42 is provided between the bottom wall 41d of the battery containing portion 41 and the front wall 45e of the battery pack 21.

In FIGS. 2 and 7, by providing the gaps 42, 61, 62 in addition to the plurality of drain holes 41x, the convection of warm air generated by heat dissipated from the battery pack 21 can be promoted, whereby heat can easily be dissipated.

The lower surface 45q of the battery pack 21 slides on the lower surface 41p of the battery containing portion 41. A projecting portion, extending in the direction in which the battery pack 21 is installed and removed, may be provided on the lower surface 41p of the battery containing portion 41 or the lower surface 45q of the battery pack 21 to thereby form a gap between the lower surfaces 41p, 45q. This can promote further the convection of warm air in the interior of the battery containing portion 41 described above.

As illustrated in FIG. 2 and described above, the electrically driven snowplow 10 as the working machine includes the battery pack 21 incorporating the battery 46, the battery containing portion 41 disposed so that the battery pack 21 can be inserted and removed in the direction inclined from the vertical direction, and the electrode portion 43 disposed on the upper surface 41h of the battery containing portion 41 for connection with the output terminal 47 of the battery 46.

According to this configuration, rain water, snow, and melting snow can be restrained from adhering to the electrode portion 43 and the output terminal 47.

The electrode portion 43 is disposed further inwards of the battery containing portion 41 than the vertical line 40 passing through the upper edge of the containing portion opening 41e of the battery containing portion 41.

According to this configuration, rain water, snow, and melting snow can be restrained further from adhering to the electrode portion 43 and the output terminal 47.

In addition, since the bent back portion 41f is provided on the side of the battery containing portion 41, the side situated closer to the containing portion opening 41e than the electrode portion 43, rain water, snow and melting snow can be blocked by the bent back portion 41f to thereby be prevented from adhering to the electrode portion 43 and the output terminal 47.

The containing portion opening 41e of the battery containing portion 41 is covered with the lid 32 that can be opened and closed, and the other end portion 32b of the lid 32 as the distal end portion thereof is situated closer to the containing portion opening 41e than the vertical line 40 that passes through the upper edge of the containing portion opening 41e of the battery containing portion 41 in the fully openable and closable range of the lid 32.

According to this configuration, rain water, snow and melting snow can be restrained further from entering the interior of the battery containing portion 41 from the containing portion opening 41e by the lid 32, whereby rain water, snow and melting snow can be prevented from adhering to the output terminal 47 of the battery 46 and the electrode portion 43.

Second Embodiment

Figure 8:
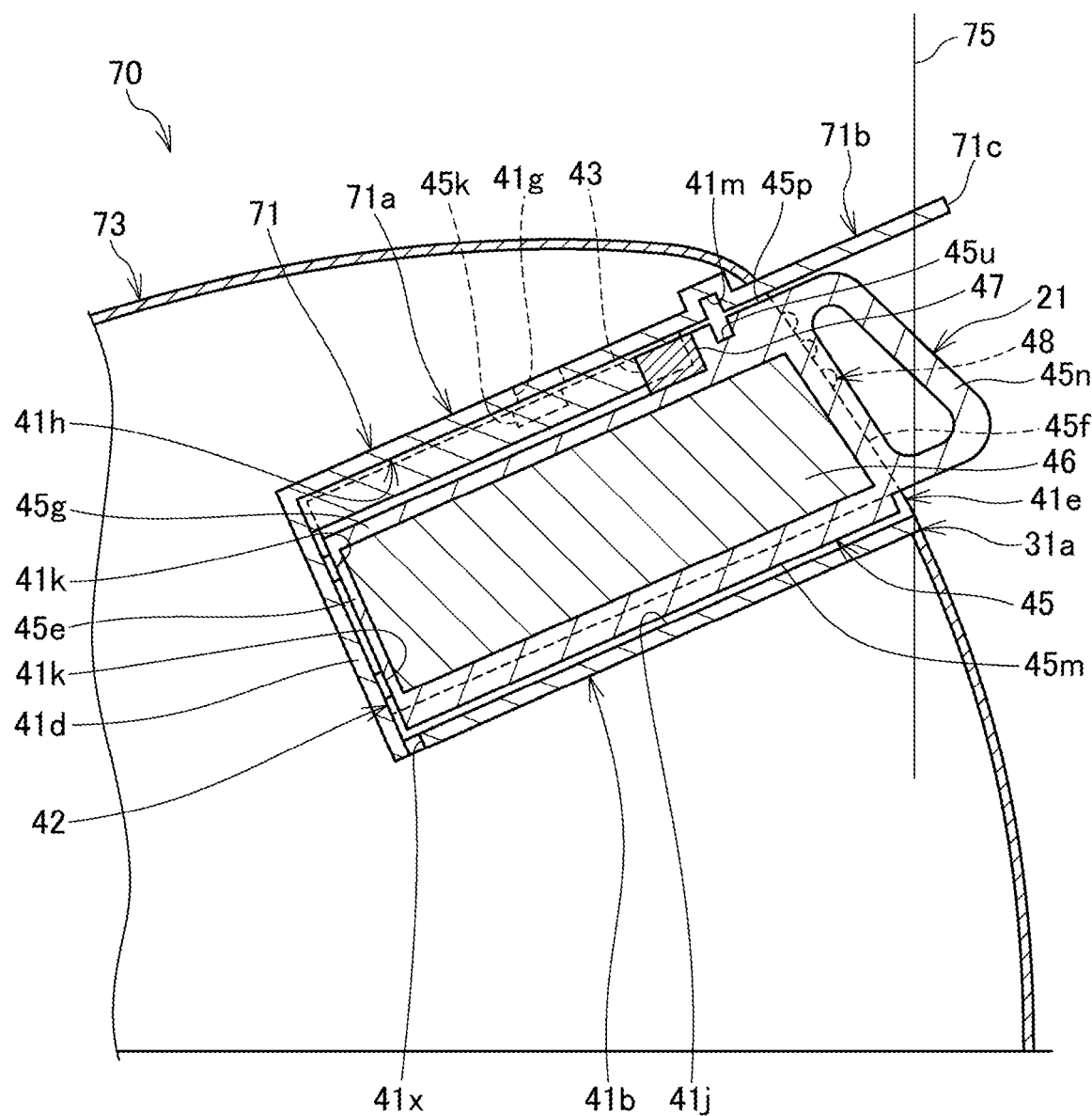
FIG. 8 is a cross-sectional view illustrating a battery pack containing structure of a second embodiment.

FIG. 8 is a cross-sectional view illustrating a battery pack containing structure of a second embodiment.

A battery pack containing structure of a snowplow 70 illustrated in FIG. 8 differs from the battery pack containing structure of the snowplow 10 of the first embodiment illustrated in FIG. 2 in the structure of a battery containing portion 71, the structure of a body cover 73 and in that the lid 32 (refer to FIG. 3) is not provided. In the second embodiment, like reference signs will be given to like structures to those of the first embodiment, and the description thereof will be omitted.

The battery containing portion 71 is formed into a box shape including an upper wall 71a, a lower wall 41b, a pair of left and right side walls 41c (refer to FIG. 3) and a bottom wall 41d and includes a containing portion opening 41e through which a battery pack 21 is inserted and removed.

The battery containing portion 71 is made from a resin and is supported on a body frame 11 (refer to FIG. 1). As with the first embodiment, the upper wall 71a and the lower wall 41b of the battery containing portion 71 are inclined by angle θ1 (refer to FIG. 2) relative to a vertical line 75 that extends vertically so that a containing portion opening 41e is situated above or at the same height as the bottom wall 41d.

The upper wall 71a includes an integrated penthouse portion 71b configured to cover the containing portion opening 41e from above, a pair of left and right warm air vent portions 41g configured to release warm air in an interior of the battery containing portion 71 to an exterior of the battery containing portion 71 in cooperation with the containing portion opening 41e, and a groove 41m.

An electrode portion 43 is provided on an upper surface 41h constituting an inner surface of the upper wall 71a for electrical connection with a battery pack 21 side.

A cover opening 31a is opened in an upper portion of a rear portion of a body cover 73 configured to cover over the body frame 11, and the battery containing portion 71 is inserted through the cover opening 31a.

The penthouse portion 71b extends from the cover opening 31a of the body cover 73 obliquely upwards to the rear, and a distal end portion 71c of the penthouse portion 71b is situated behind a vertical line 75 extending vertically while passing through a lower edge of the containing portion opening 41e.

In this way, by disposing the distal end portion 71c of the penthouse portion 71b behind the vertical line 75, rain water and snow can be made to hardly enter an interior of the battery containing portion 71 from the containing portion opening 41e. In addition, since a lid configured to cover the containing portion opening 41e is not provided, not only can the cost be reduced, but also the handling of the battery pack 21 when the battery pack 21 is installed and removed can be improved.

Third Embodiment

Figure 9:
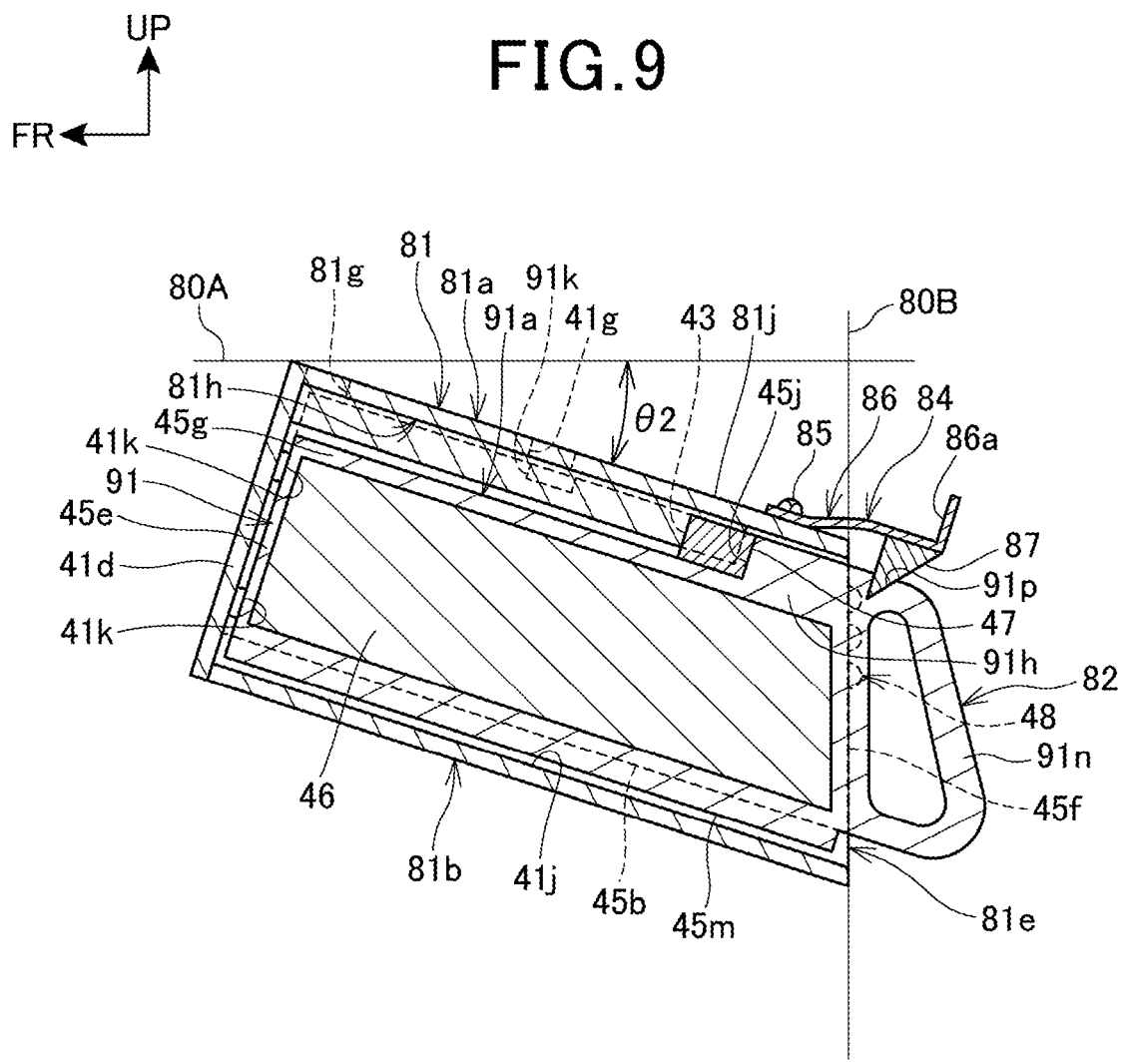
FIG. 9 is a cross-sectional view illustrating a battery pack containing structure of a third embodiment.

FIG. 9 is a cross-sectional view illustrating a battery pack containing structure of a third embodiment.

The battery pack containing structure illustrated in FIG. 9 differs from the battery pack containing structure of the first embodiment illustrated in FIG. 2 in the structure of a battery containing portion 81 and the structure of a battery pack 82. In the third embodiment, like reference signs will be given to like structures to those of the first embodiment, and the description thereof will be omitted.

The battery containing portion 81 where the battery pack 82 is detachably contained is disposed at an upper portion of a rear portion of the body frame 11 (refer to FIG. 1).

The battery containing portion 81 is formed into a box shape including an upper wall 81a, a lower wall 81b, a pair of left and right side walls 41c (refer to FIG. 7) and a bottom wall 41d and includes a containing portion opening 81e through which a battery pack 82 is inserted and removed. The battery containing portion 81 is made from a resin and is supported in the body frame 11.

The upper wall 81a and the lower wall 81b of the battery containing portion 81 are inclined by an angle θ2 relative to a horizontal line 80A extending horizontally so that the containing portion opening 81e is situated below the bottom wall 41d. The angle θ2 is set to be in a range of $0<θ2<45°$, and preferably, the angle θ2 is set to be in a range of $0<θ2<30°$. The containing portion opening 81e is formed vertically or substantially vertically along a vertical line 80B.

The upper wall 81a includes a plurality of warm air vent portions 41g, 81g configured to release warm air in an interior of the battery containing portion 81 to an exterior of the battery containing portion 81. A pair of left and right warm air vent portions 81g is formed at an edge portion of the upper wall 81a, the edge portion situated on a side facing the bottom wall 41d, and the warm air vent portions 81g each have the same structure as that of the warm air vent portion 41g.

An electrode portion 43, configured to be electrically connected with a battery pack 82 side, is provided on an upper surface 81h constituting an inner surface of the upper wall 81a. An engagement portion 84, configured to be brought into engagement with the battery pack 82 inserted into the battery containing portion 81, is provided on an outer surface 81j of the upper wall 81a.

The engagement portion 84 includes a plate-like elastic member 86 that is attached to the upper wall 81a with a plurality of machine screws 85 and a hook portion 87 that is provided on the elastic member 86. A finger hook portion 86a, designed for the finger to be hooked, is provided at an end portion of the elastic member 86.

A guide groove 41j, configured to guide the battery pack 82 when the battery pack 82 is caused to slide into a predetermined position in the interior of the battery containing portion 81 for containment, is formed on the lower wall 81b.

The battery pack 82 includes a battery case 91, a battery 46 incorporated in the battery case 91, and an output terminal 47 attached to an outer surface of the battery case 91 to output electric power of the battery 46.

The battery case 91 does not include the groove 45u on the upper wall 45a of the battery case 45 of the first embodiment, and a handle 91n has a different shape from that of the handle 45n of the first embodiment.

That is, the battery case 91 is formed into a box shape including an upper wall 91a, a lower wall 45b, a pair of left and right side walls 45c (refer to FIG. 7), a front wall 45e and a rear wall 45f.

The upper wall 91a includes a lowered wall 45g, a raised wall 91h formed taller than the lowered wall 45g, and a step portion 45j formed between the lowered wall 45g and the raised wall 91h.

A pair of left and right heat dissipating portions 91k, configured to promote the dissipation of heat from the battery 46, is provided in the raised wall 91h.

The rear wall 45f integrally includes the handle 91n that is gripped on by the hand, and a residual amount indicator 48, configured to indicate a residual amount of the battery 46, is provided on the rear wall 45f situated at a side of the handle 91n.

The handle 91n includes a notched portion 91p formed on a side facing the raised wall 91h so that the hook portion 87 of the engagement portion 84 can be brought into engagement therewith.

With the battery pack 82 contained in the battery containing portion 81, the hook portion 87 of the engagement portion 84 is biased by the elastic member 86 and is kept in engagement with the notched portion 91b on the handle 91n.

When the engagement portion 84 is swung upwards against the biasing force of the elastic member 86 by the finger hooked on the finger hook portion 86a of the engagement portion 84 from the state where the battery pack 82 is in engagement in the way described above, the hook portion 87 of the engagement portion 84 is dislocated from the notched portion 91p on the handle 91n. As a result, the battery pack 82 can be pulled out of the battery containing portion 81 to be removed therefrom.

Thus, as described above, in this embodiment, the upper wall 81a and the lower wall 81b of the battery containing portion 81 are inclined relative to the horizontal line 80A so that the containing portion opening 81e is situated below the bottom wall 41d. This can make it difficult for rain water and snow to enter the interior of the battery containing portion 81, and even though rain water and snow enter the interior of the battery containing portion 81, rain water and snow can be discharged from the interior of the battery containing portion 81 quickly. Thus, rain water and snow can be prevented from adhering to the electrode portion 43 of the battery containing portion 81 and the output terminal 47 of the battery pack 82.

The embodiments that have been described heretofore do nothing but only describe one form of the present invention and hence can be modified or applied arbitrarily without departing from the spirit and scope of the present invention.

For example, in the embodiment, as illustrated in FIG. 2, the battery containing portion 41 and the battery 46 (and hence, the battery pack 21) are inclined rearwards relative to the vertical line 40; however, the configuration is not limited thereto, and hence, the battery containing portion 41 and the battery 46 (and hence, the battery pack 21) may be inclined transversely relative to the vertical line 40.

In addition, as illustrated in FIG. 2, the groove 41m as the recessed portion is formed on the upper surface 41h of the battery containing portion 41, and the groove 45u as the recessed portion is formed on the upper surface 45p of the battery pack 21; however, the configuration is not limited thereto. A V-like projecting portion may be formed on each of the upper surface 41h of the battery containing portion 41 and the upper surface 45p of the battery pack 21 in place of the grooves 41m, 45u.

Additionally, in the embodiments, the snowplow is described as being the working machine; however, the structure of the present invention can also be applied to other working machines (for example, a lawn mower, a rotary tiller, a water pump, a conveyor robot, and the like).

Description of Reference Signs 10, 70 snowplow (working machine)
32 lid
40 vertical line
41, 71, 81 battery containing portion
41d bottom wall (bottom portion)
41e, 81e containing portion opening (opening)
41f bent back portion
41g, 81g warm air vent portion
41h, 81h upper surface (internal upper surface of battery containing portion)
41j guide groove
41m groove (recessed portion)
41p lower surface (internal lower surface of battery containing portion)
43 electrode portion
45e front wall (bottom portion)
45k heat dissipating portion
45p upper surface (upper surface of battery)
46 battery
47 output terminal (terminal)

What is claimed is:

1. A snowplow, comprising:
a battery;
a battery containing portion disposed to allow the battery to be inserted and removed in a direction inclined relative to a vertical direction;
an electrode portion disposed on an internal upper surface of the battery containing portion to be connected with a terminal of the battery; and
a body cover covering the battery containing portion from above, wherein
the battery containing portion includes a containing portion opening through which the battery is inserted and removed,
the battery containing portion is formed into a box shape having an upper wall, a lower wall, a pair of side walls and a bottom wall to form the containing portion opening, the internal upper surface is an inner surface of the upper wall,
each of the upper and lower walls is inclined at an inclination angle relative to the vertical direction so that an upper edge of the containing portion opening is situated above the bottom wall,
the body cover includes a cover opening through which the battery containing portion is inserted, the upper wall includes a bent back portion that extends upwards from an upper edge of the upper wall, that extends at a different angle from the inclination angle of the upper wall, and that extends through the cover opening from an inside of the body cover to an outside of the body cover, the electrode portion is disposed more inwards of the battery containing portion than the bent back portion, wherein the battery comprises:
- a groove disposed on an upper surface of the battery at a position closer to the containing portion opening side than the terminal; and,
- a pair of heat dissipating portions disposed at a position lower than the terminal of the battery contained in the battery containing portion, the terminal is disposed at a position lower than the groove of the battery contained in the battery containing portion, the battery comprises an upper wall, the upper wall of the battery includes:
- a lowered wall that extends in an inserted and removed direction in which the battery is installed and removed; and
- a raised wall surrounding the lowered wall from both sides in a width direction of the battery and from the containing portion opening side, the width direction being orthogonal to the inserted and removed direction along the upper surface of the battery, the terminal is provided on an upper surface of the lowered wall, the pair of heat dissipating portions are provided on an upper surface of the raised wall at the both sides, the groove is provided on the upper surface of the raised wall at the containing portion opening side, the groove is formed into a V-like shape in the width direction, and a closed portion of the V-like shape is situated on the opening side of the battery contained in the battery containing portion, while an open portion of the V-like shape is situated on a bottom portion side of the battery contained in the battery containing portion.

2. The snowplow according to claim 1,
wherein the electrode portion is disposed more inwards of the battery containing portion than a vertical line passing through the upper edge of the containing portion opening of the battery containing portion.

3. The snowplow according to claim 1,
wherein the containing portion opening of the battery containing portion is covered by a lid that can be opened and closed, and wherein a distal end portion of the lid is situated closer to the containing portion opening side than the vertical line passing through the upper edge of the containing portion opening of the battery containing portion in a fully openable and closable range of the lid.

4. The snowplow according to claim 1, comprising:
a guide groove configured to guide a slide of the battery, the guide groove provided on an internal lower surface of the battery containing portion.

5. The snowplow according to claim 2,
wherein the containing portion opening of the battery containing portion is covered by a lid that can be opened and closed, and wherein a distal end portion of the lid is situated closer to the containing portion opening side than the vertical line passing through the upper edge of the containing portion opening of the battery containing portion in a fully openable and closable range of the lid.

6. The snowplow according to claim 2, comprising:
a guide groove configured to guide a slide of the battery, the guide groove provided on an internal lower surface of the battery containing portion.

7. The snowplow according to claim 3, comprising:
a guide groove configured to guide a slide of the battery, the guide groove provided on an internal lower surface of the battery containing portion.

8. The snowplow according to claim 2, wherein
the bent back portion extends along the vertical line.

9. The snowplow according to claim 1, wherein
the bent back portion extends along a vertical line passing through the upper edge of the containing portion opening.

10. The snowplow according to claim 1, wherein
the containing portion opening of the battery containing portion is covered by a lid that can be opened and closed, the lid includes a base end portion that is supported to the body cover, the lid extends from the base end portion to a distal end portion of the lid in a curved shape, the lid covers the containing portion opening and the bent back portion, the lid is configured to be held at a fully open position in which the lid is fully opened, the distal end portion of the lid at the fully open position is situated closer to the containing portion opening side than a vertical line passing through the upper edge of the containing portion opening.

* * * * *